United States Patent
Fowell et al.

[11] Patent Number: 6,152,403
[45] Date of Patent: Nov. 28, 2000

[54] GYROSCOPIC CALIBRATION METHODS FOR SPACECRAFT

[75] Inventors: Richard A. Fowell, Culver City; John F. Yocum, Rancho Palos Verdes, both of Calif.

[73] Assignee: Hughes Electronics Corporation, El Segundo, Calif.

[21] Appl. No.: 09/189,558

[22] Filed: Nov. 11, 1998

[51] Int. Cl.[7] .............................. B64G 1/28; B64G 1/36; G01C 21/00; G06G 7/78

[52] U.S. Cl. .......................... 244/165; 244/171; 701/220; 701/224

[58] Field of Search ...................... 356/376; 250/559.22, 250/231.14; 244/3.18, 164, 165, 168, 169, 170, 171; 701/207, 220, 224, 226, 221; 33/356; 73/1.76

[56] References Cited

U.S. PATENT DOCUMENTS

| | | | |
|---|---|---|---|
| 4,347,730 | 9/1982 | Fisher et al. | 73/1.76 |
| 4,884,771 | 12/1989 | Scheit et al. | 244/165 |
| 5,132,910 | 7/1992 | Scheit et al. | 364/459 |
| 5,345,382 | 9/1994 | Kao | 364/424.01 |
| 5,558,305 | 9/1996 | Surauer et al. | 244/171 |
| 5,562,266 | 10/1996 | Achkar et al. | 244/171 |
| 5,667,171 | 9/1997 | Fowell et al. | 244/165 |
| 5,738,309 | 4/1998 | Fowell | 244/171 |
| 5,826,828 | 10/1998 | Fowell et al. | 244/164 |
| 6,032,903 | 3/2000 | Fowell et al. | 244/165 |

OTHER PUBLICATIONS

Auburn, J.H.C., et al., "Olympus Manoeuvres in Transfer Orbit–an ESA First", *ESA Bulletin*, Nov., 1990, pp. 67–71.
Burton, Michael, "Development of the Attitude and Orbit Control Subsystem for the Olympus Satellite", AAS 84–001 paper, pp. 67–71.

*Primary Examiner*—Michael J. Carone
*Assistant Examiner*—Fredrick T. French, III
*Attorney, Agent, or Firm*—T. Gudmestad; M. W. Sales

[57] ABSTRACT

Spacecraft cost, volume and weight are reduced with gyroscope calibration methods that can be effected with structures (e.g., a single-axis Sun sensor and a wheel system) which are typically carried by spacecraft for other purposes. In a method embodiment, these methods include an initial step 1) of calibrating a selected gyroscope and subsequent steps for each uncalibrated gyroscope of: 2) slewing the spacecraft by a slew angle and controlling attitude with the uncalibrated gyroscope for a selected time period to thereby couple its drift into the inertial axis of a calibrated gyroscope, 3) backslewing the spacecraft to return the calibrated gyroscope to its inertial axis, and 4) measuring an error angle generated by the uncalibrated gyroscope during the selected time period (e.g., with a Sun sensor or with the calibrated gyroscope). In another embodiment, steps 2–4 are replaced by steps of: 5) orienting a momentum vector to inhibit spacecraft rotation about an uncalibrated gyroscope's respective axis, and 6) calibrating the uncalibrated gyroscope from its output signal. Another method embodiment retains steps 5 and 6 but replaces the initial step 1) by repeating steps 5 and 6 with a different momentum vector. Drift components are thus sensed in two different spacecraft planes and these components are mathematically resolved to find gyroscope drifts.

20 Claims, 8 Drawing Sheets

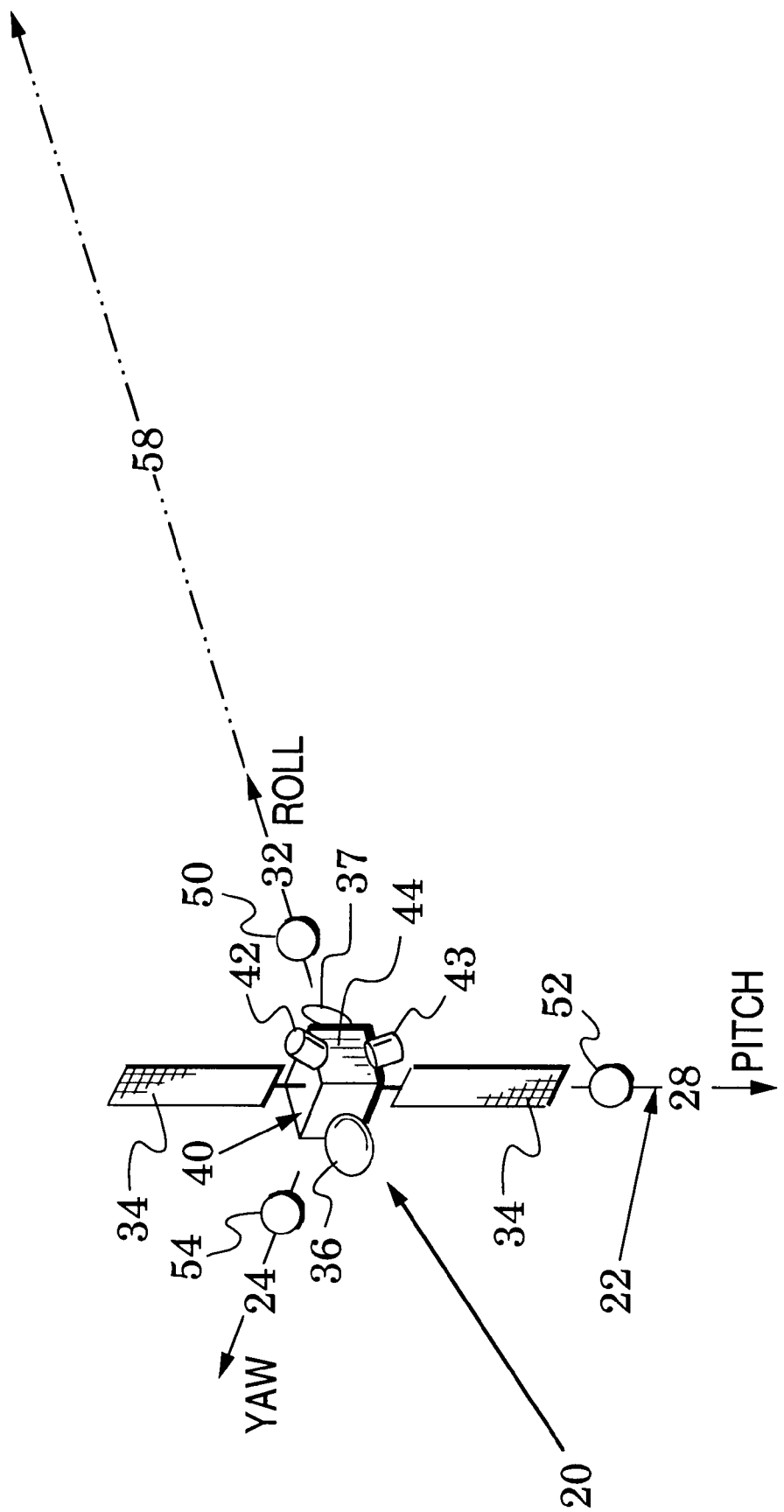

GYROSCOPIC CALIBRATION METHODS FOR SPACECRAFT

BACKGROUND OF THE INVENTION

1. Field of the Invention

The present invention relates generally to spacecraft and, more particularly, to spacecraft gyroscopes.

2. Description of the Related Art

Knowledge of spacecraft attitude and the ability to control this attitude are critical features that enable successful operations (e.g., antenna pointing and solar panel orientation) of spacecraft systems. Attitude knowledge and control are respectively realized with attitude detectors and attitude controllers. Spacecraft attitude detectors include sensors (e.g., Sun sensors, Earth sensors and star sensors) which are responsive to celestial radiating bodies and sensors which are responsive to other radiating sources with known locations (e.g., an Earth-based microwave beacon). Spacecraft attitude controllers include torque generators of various types (e.g., momentum wheels, reaction wheels, thrusters and magnetic torquing coils).

Radiating-body sensors provide absolute attitude information. Sun sensors, for example, are typically referred to as single-axis if they detect the Sun's presence along a single inertial plane and as two-axis if they detect the Sun's presence along two intersecting inertial planes. Either type has at least one angular radiation-receiving slot which is usually centered about a selected one of a spacecraft's coordinate axes. The receiving slot must be unobstructed which imposes limitations on other spacecraft structures. In addition, radiating-body sensors occupy spacecraft volume and add to a spacecraft's cost and weight. It is desirable, therefore, to reduce the number and the field-of-view of such detectors that a spacecraft carries.

There are occasions in which absolute attitude information is not available. As a first example, electrostatic thrusters have been proposed for conducting transfer orbits (e.g., from a low-Earth orbit to a geosynchronous orbit). Due to their low thrust levels, the time duration of a transfer orbit may be extensive (e.g., 30–90 days) and preferred flight attitudes may prohibit the use of radiating-body sensors for extended periods (e.g., 2–3 days). As a second example, acquisition time of an Earth-based microwave beacon is sometimes lengthy (e.g., a few hours) and absolute attitude information is absent during this acquisition time. In a final example, failure of one radiating-body sensor may require a change of spacecraft attitude to facilitate the acquisition of another. Absolute attitude information is unavailable for the duration of such an attitude change.

Accordingly, spacecraft are generally also equipped with gyroscopes which provide attitude information without sensing the presence of a radiating body. In contrast, they provide relative attitude information because they sense changes in inertial-space orientation. Spacecraft gyroscopes are fabricated in various types (e.g., rotating-mass gyroscopes, vibrating-mass gyroscopes, ring-laser gyroscopes and fiber-optics gyroscopes) but are typically structured to be responsive to spacecraft rotation about a respective spacecraft axis and to generate an output signal which is representative of this rotation. For example, a rate gyroscope's output signal indicates rotational rate and a rate integrating gyroscope's output signal indicates rotational angle.

Unfortunately, gyroscopes typically exhibit gyroscopic drift, i.e., their output signal indicates rotation when there is none. To enhance the accuracy of the gyroscope's output signal, this gyroscopic drift must be measured and subtracted from the output signal to produce a true rotation signal. Although gyroscopic drift can be determined prior to placement of a spacecraft into orbit, various effects (e.g., radiation, temperature, vibration and aging) alter the drift. As a consequence, gyroscopic drift must generally be established in space and periodically repeated when attitude information is especially critical (e.g., prior to a spacecraft attitude control maneuver.

Methods for calibrating gyroscopic drift in space have often made use of Sun sensors. In one conventional calibration method (see Auburn, J. H. C., et al., "Olympus Manoeuvres in Transfer Orbit-an ESA First", *ESA Bulletin*, November, 1990, pp. 67–71 and Burton, Michael, AAS 84-001 paper, pp. 3–18), a spacecraft is maneuvered to place a first coordinate axis (e.g., a Z axis of an orthogonal-axes coordinate system) in a Sun-pointing attitude. In this configuration, both the X and Y axes are held orthogonal to a Sun line so that the drift rates of their respective gyroscopes can be calibrated simultaneously.

This configuration is maintained for a time period while the angular estimates derived from the gyroscope measurements are compared to those from the Sun sensor measurements. The difference between the results at the beginning and end of the time period divided by the time difference gives the apparent gyroscopic drift rate. This can be corrected for the apparent motion of the Sun during the calibration period. A similar process is performed for the remaining gyroscope after the spacecraft is maneuvered to place a different coordinate axis in a Sun-pointing attitude so that the Z axis is now held orthogonal to the Sun's direction. Because this calibration process requires a pair of two-axis Sun sensors, it incurs a significant cost, volume and weight penalty.

An exemplary calibration process of U.S. Pat. No. 4,884, 771 includes the steps of: a) using a two-axis sensor for measuring the direction of a radiating reference, b) commanding a spacecraft to adopt two different reference attitudes during two consecutive time intervals, c) recording the actual directions of the reference during the two time intervals, d) obtaining the time integrals of the gyroscopes' output signals during the two time intervals and e) determining the gyroscopic drifts from the time integrals representing the gyroscopic drift plus the instantaneous respective spacecraft deviation from the commanded reference orientations and from the sensor measurements. Although this method only requires a single two-axis Sun sensor, its field-of-view must be wide enough to accurately include the two different reference attitudes.

SUMMARY OF THE INVENTION

The present invention is directed to methods for calibrating spacecraft gyroscopes that do not require an Earth reference, a plurality of Sun sensors nor an expensive wide-angle Sun sensor. In particular, the invention is directed to methods that can be practiced with structures (e.g., a single-axis Sun sensor and a wheel system) that are typically carried by spacecraft for other purposes so that calibration is effected without incurring additional cost, volume and weight penalties.

In an embodiment of the invention, these goals are achieved with an initial step 1) of calibrating a selected gyroscope and subsequent steps for each uncalibrated gyroscope of: 2) slewing the spacecraft by a slew angle and controlling attitude with the uncalibrated gyroscope for a selected time period to thereby couple its drift into the inertial axis of a calibrated gyroscope, 3) backslewing the spacecraft to return the calibrated gyroscope to its inertial axis, 4) measuring an error angle generated by the uncalibrated gyroscope during the selected time period and 5) using the slew angle, the selected time period and the error angle to calibrate the uncalibrated gyroscope.

The initial calibration is preferably effected with a radiant-body sensor, e.g., a conventional single-axis or two-axis Sun sensor. In this case, step 4 can also be effected with the Sun sensor. Alternatively (or if the error angle exceeds the Sun sensor's field-or-view), step 4 can be effected by rotating the spacecraft under control of the calibrated gyroscope by a calibrated correction angle that eliminates (and thereby measures) the error angle.

In another embodiment of the invention, steps 2–5 are replaced by steps of: 6) orienting a momentum vector to inhibit spacecraft rotation about an uncalibrated gyroscope's respective axis, and 7) calibrating the uncalibrated gyroscope from its output signal. The orienting step is preferably effected by generating the momentum vector with a wheel system and maintaining spacecraft attitude during the generating step with an applied external torque from a source such as a thruster or a magnetic torquer. Error contributions from constant external torque forces can be reduced by repeating steps 5 and 6 with a reversed momentum vector.

Another embodiment of the invention retains steps 6 and 7 but replaces the initial step 1) by repeating steps 6 and 7 with a different momentum vector, e.g., one that is not colinear with the first. With this combination of process steps, drift components are sensed in two different spacecraft planes that are respectively orthogonal to the initial and different momentum vectors. Gryoscopic drifts are then found by mathematically resolving the drift components in two known and different spacecraft planes. This embodiment has the significant advantage of not requiring the presence of a radiating-body sensor.

The novel features of the invention are set forth with particularity in the appended claims. The invention will be best understood from the following description when read in conjunction with the accompanying drawings.

BRIEF DESCRIPTION OF THE DRAWINGS

FIGS. 3A–3C are perspective views of the spacecraft; of FIG. 2 which illustrate process steps of the flow chart of FIG. 1;

DETAILED DESCRIPTION OF THE PREFERRED EMBODIMENTS

Figure 1:
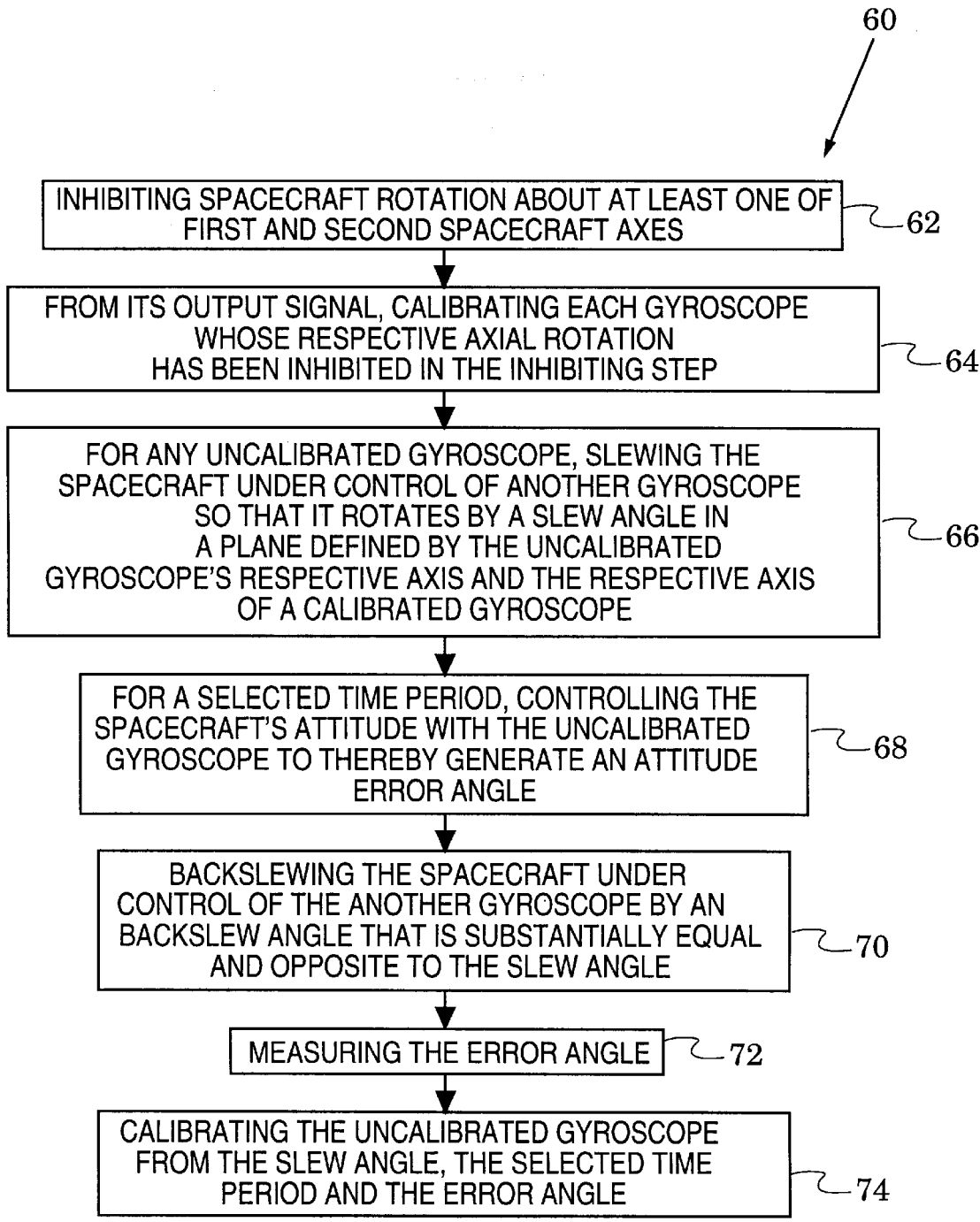
FIG. 1 is a flow chart which illustrates steps of a method of the present invention for calibrating spacecraft gyroscopes.
Figure 3B:
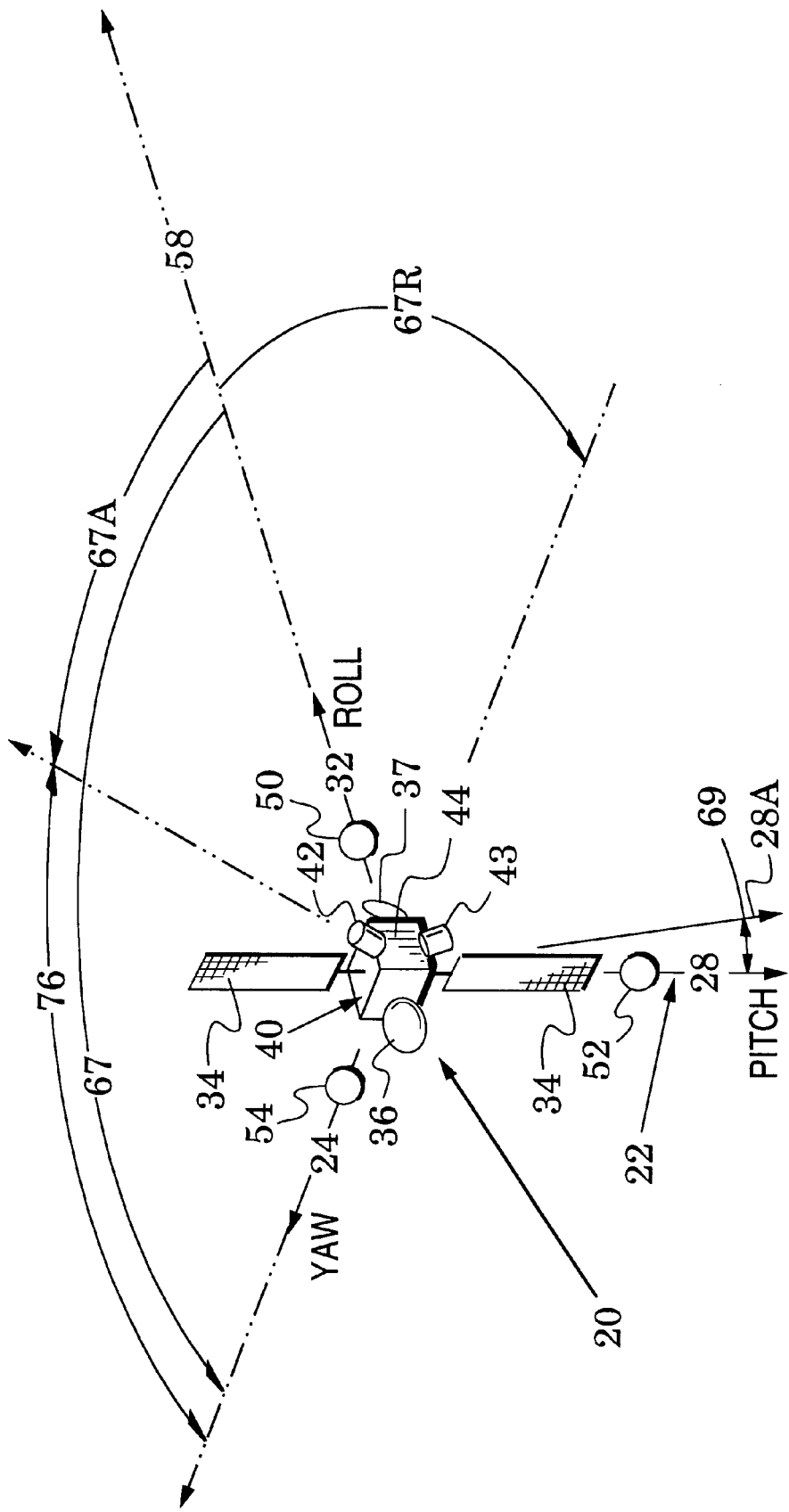
Figure 3C:
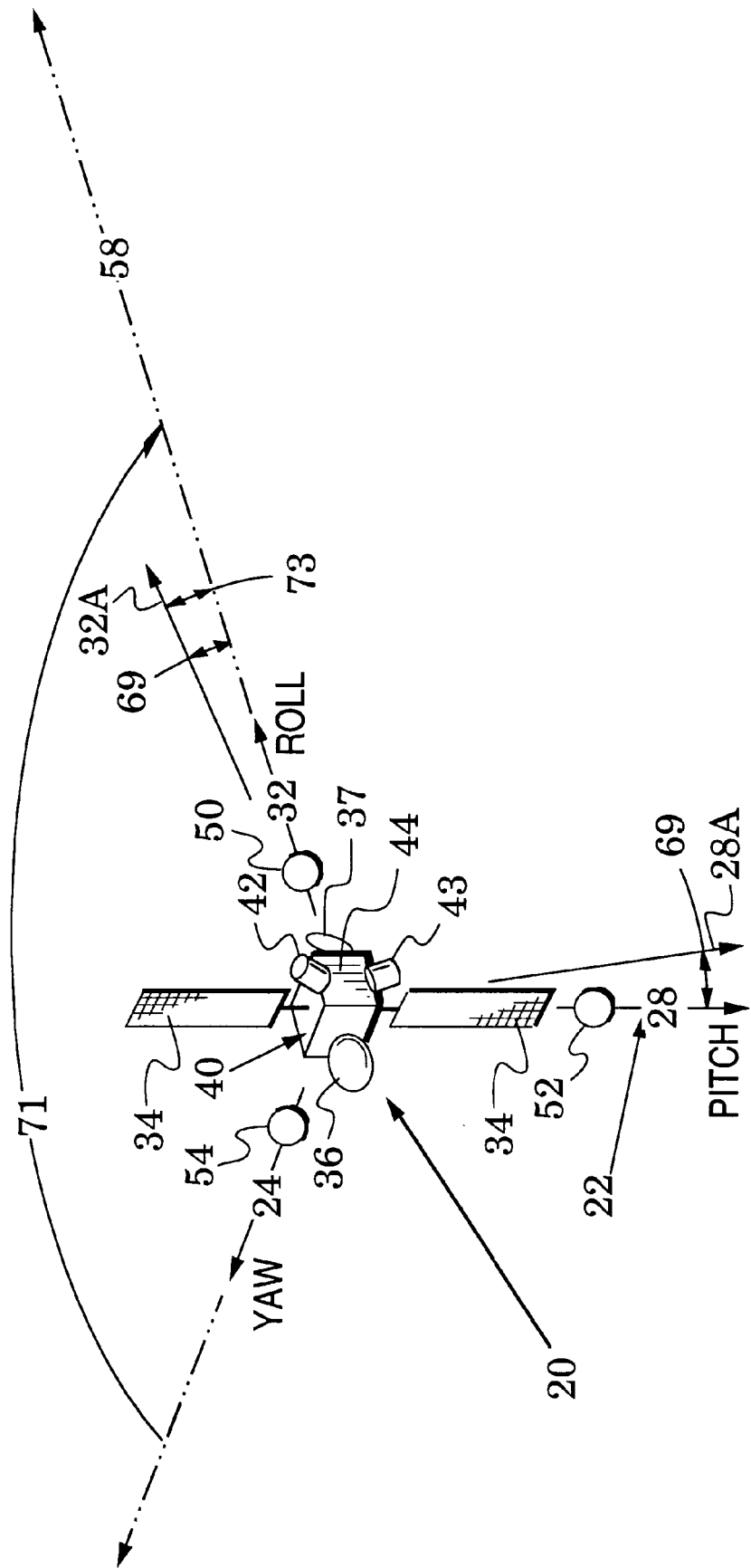

A method embodiment of the invention for calibrating gyroscopes is illustrated in the flow chart of FIG. 1 and is exemplified in FIGS. 3A–3C. In these figures it is assumed that each of the gyroscopes generates an output signal that is representative of spacecraft rotation about a respective spacecraft axis.

Figure 2:
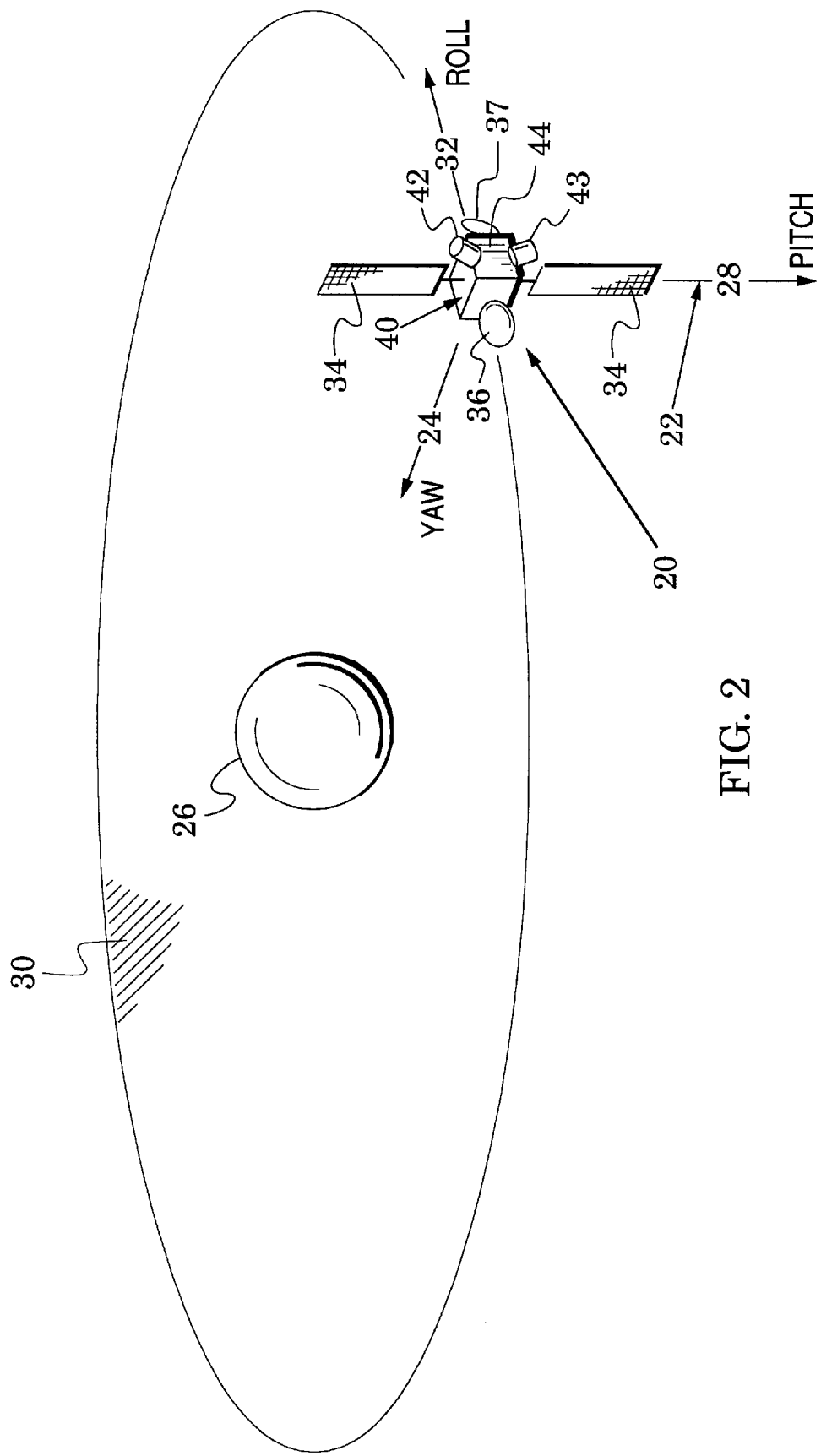
FIG. 2 is a perspective view of a spacecraft in orbit about the Earth.

FIGS. 3A–3C refer to an exemplary spacecraft which is initially shown in FIG. 2 as a body-stabilized satellite 20 with a coordinate system 22 that has an origin at the satellite's center of mass. The coordinate system 22 has a yaw axis 24 which is directed from the origin towards the Earth 26. A pitch axis 28 is directed from the origin and is orthogonal to the satellite's orbital plane 30. A roll axis 32 is orthogonal to the other two axes and is aligned with the satellite's velocity vector. As the body-stabilized satellite 20 orbits the Earth 26, its yaw axis 24 generally rotates to be constantly directed at the Earth's center of mass.

One or more solar cell arrays 34 are typically extended from the spacecraft so that they can rotate about the pitch axis 28 to enhance their exposure to the Sun. Antennas (e.g., the antennas 36 and 37) are usually directed towards the Earth for communication and thrusters are carried on the spacecraft's body 40 to facilitate stationkeeping and attitude control. Although the thrusters 42 and 43 can be carried on various body faces, they are carried on the antinadir face 44 in this exemplary spacecraft. In FIG. 2, the axis arrows 24, 28 and 32 indicate the positive directions of the coordinate axes.

The spacecraft 20 is shown again in each of FIGS. 3A–3C which indicate that it also includes a roll gyroscope 50, a pitch gyroscope 52 and a yaw gyroscope 54. These gyroscopes sense spacecraft rotation respectively about the roll axis 32, the pitch axis 28 and the yaw axis 24 (the gyroscopes and their respective axes are denoted ROLL, PITCH and YAW in the figures). As mentioned above, spacecraft gyroscopes are made in various forms which are not necessarily positioned colinearly with their respective axes but they are shown in this position in FIG. 3A and are further moved outward from the spacecraft body 40 to enhance clarity of illustration and description.

An exemplary single-axis Sun sensor has a radiation receiving slit that defines narrow (e.g., 3 degrees) and wide (e.g., 90 degrees) receiving angles along two orthogonal planes. Such a sensor can be positioned in the spacecraft 20 with its wide receiving angle aligned in the roll-yaw plane and substantially centered about the roll axis. Accordingly, its narrow receiving angle will be orthogonal to the roll-yaw plane. By employing feedback signals from this single-axis Sun sensor, the spacecraft's attitude-control system can orient the spacecraft 20 so that its roll-yaw plane extends through the Sun. Spacecraft rotation is thus permitted about the roll and pitch axes but substantially prohibited about its yaw axis.

In contrast, an exemplary two-axis Sun sensor receives radiation through two orthogonal slits in which each slit has narrow and wide receiving angles. Consequently, a two-axis Sun sensor can provide narrow viewing angles along two orthogonal axes. Such sensors are less expensive to manufacture and impose fewer restrictions on spacecraft structures (to avoid blocking the sensor's view) than a wide-angle sensor. A two-axis Sun sensor can be positioned in the spacecraft 20 with one slit oriented along the roll-yaw plane and the other oriented along the roll-pitch plane. By employing feedback signals from this two-axis Sun sensor, the spacecraft's attitude-control system can orient the spacecraft 20 so that its roll-yaw and roll-pitch planes pass through the Sun and, therefore, the roll axis is essentially colinear with the Sun line 58. Accordingly, spacecraft rotation is now permitted about the roll axis but substantially prohibited about the yaw and pitch axes.

The preceding discussion of exemplary single-axis and two-axis Sun sensors enhances an understanding of the processes recited in the flow chart 60 of FIG. 1. In the following description of this flow chart, it is initially assumed that the spacecraft (20 in FIGS. 3A–3C) employs a single-axis Sun sensor whose receiving slit is aligned with the roll-yaw axis.

In a first process step 62, the spacecraft's attitude-control system uses feedback signals from the single-axis Sun sensor to inhibit inertial rotation about at least one of first and second spacecraft axes (i.e., about the yaw axis in this particular description). From its output signal, each gyroscope whose respective axial rotation has been inhibited in the inhibiting step is then calibrated in process step 64.

In the present case, the yaw gyroscope 54 can be calibrated from its output signal. Because rotation about this gyroscope's axis is inhibited, the output signal of this gyroscope represents its drift signal, i.e., its error signal. Once this gyroscopic drift is established (i.e., calibrated), it can be subtracted from subsequent gyroscopic signals to obtain a true yaw rotation signal.

Process step 66 applies to any uncalibrated gyroscope, i.e., to roll and pitch gyroscopes 50 and 52. For the roll gyroscope 50, for example, the spacecraft is slewed in FIG. 3B under control of another gyroscope (i.e., the pitch gyroscope 52) so that it rotates by a slew angle 67 in a plane defined by the uncalibrated gyroscope's respective axis (i.e., the roll axis 32) and the respective axis of a calibrated gyroscope (i.e., the yaw axis 24). Initially, it is assumed that the slew angle is 90 degrees as indicated by the slew angle 67.

For a selected time period in process step 68 of FIG. 1, the spacecraft's attitude is controlled with the uncalibrated gyroscope (i.e., the roll gyroscope 50). If the roll gyroscope has a drift component, then the spacecraft's attitude control system will respond by rotating the spacecraft in accordance with the magnitude of this component. As a consequence, the spacecraft 20 will be rotated by an error angle that is indicative of the gyroscopic drift and the time period. This will cause the pitch axis 28 to rotate by an error angle 69 to a new axis location 28A as shown in FIG. 3B.

As stated in process step 70 of FIG. 1, the spacecraft is then backslewed in FIG. 3C by a backslew angle 71 that is substantially equal and opposite to the slew angle (67 in FIG. 3B). This process rotates the roll axis 32 back to a position 32A that differs from the original axis 32 by the error angle 69.

The error angle 69 is measured in process step 72 and in process step 74, the uncalibrated gyroscope is calibrated from its associated slew angle, time period and error angle. The uncalibrated gyroscope (i.e., the gyroscope 50) generated a measured error angle 69 in a known time period. With the initial assumption that the slew angle is 90 degrees, the gyroscope's drift is therefore the error angle divided by the time period.

If the error angle 69 is small enough that the spacecraft's Sun sensor can receive the Sun's radiation, the angle measurement of process step 72 can simply be effected with the Sun sensor. Alternatively, the error angle 69 can be measured by rotating the spacecraft under control of the calibrated gyroscope (i.e., the yaw gyroscope 54) by a calibrated correction angle (73 in FIG. 3C) that eliminates the error angle 69. In a process embodiment, this step is realized by stopping the spacecraft rotation when the Sun's radiation is again centered in the single-axis Sun sensor's receiving slit.

Process steps 66, 68, 70, 72 and 74 are directed to any uncalibrated gyroscope. Accordingly, the above processes are now repeated to calibrate the pitch gyroscope 52. Both the yaw and the roll gyroscopes are now calibrated gyroscopes. One can be selected to be the "calibrated gyroscope" and the other will then be the "another gyroscope" that are recited in step 66. In this process of calibrating the spacecraft's gyroscopes, the slewing, backslewing and rotating steps (66, 70 and 72 in FIG. 1) were preferably realized with devices (e.g., momentum wheels) of the spacecraft's attitude-control system).

The description above assumed the use of a single-axis Sun sensor. If instead, a two-axis Sun sensor is aligned along the roll axis 32 of FIG. 3A, then rotation can be inhibited in both the yaw and pitch axes 24 and 28 in process step 62. Accordingly, both of these gyroscopes would be calibrated in step 64. In step 66, one of these gyroscopes can be selected to be the "calibrated gyroscope" and the other will then be the "another gyroscope" of step 66. Steps 66, 68, 70, 72 and 74 are then conducted to calibrate the only remaining uncalibrated gyroscope, i.e., the roll gyroscope 50.

For simplicity, it was assumed in this exemplary set of steps that the slew angle (67 in FIG. 3B) was 90 degrees so that all of the drift of the uncalibrated gyroscope (i.e., the roll gyroscope 50) was coupled into the inertial axis of the calibrated gyroscope (i.e., the yaw axis 24).

In general, however, the slew angle need not be 90 degrees but, rather, it should simply have a magnitude sufficient to couple a significant portion of the drift. For example, FIG. 3B shows another slew angle 67A which differs from 90 degrees by a difference angle 76. In this case, the detected error angle is modified by simply multiplying it by the cosine of the difference angle since this represents the drift portion that is actually coupled into the inertial axis of the calibrated gyroscope.

The teachings of the flow chart 60 of FIG. 1 have been described above with reference to the use of a Sun sensor in realizing process step 62. Although this is a particularly effective method, this step may also be realized with any radiating-body sensor, e.g., Sun sensors, Earth sensors and star sensors.

The above-described method concepts may be practiced with various modifications. For example, calibration errors can be detected and reduced by repeating the steps of the flow chart 60 of FIG. 1 with a reversed slew angle. The spacecraft would now be slewed along a reversed slew angle 67R as shown in FIG. 3B. The remaining steps of FIG. 1 are then repeated. Calibration errors can be substantially reduced by averaging the results of the two processes.

Figure 4:
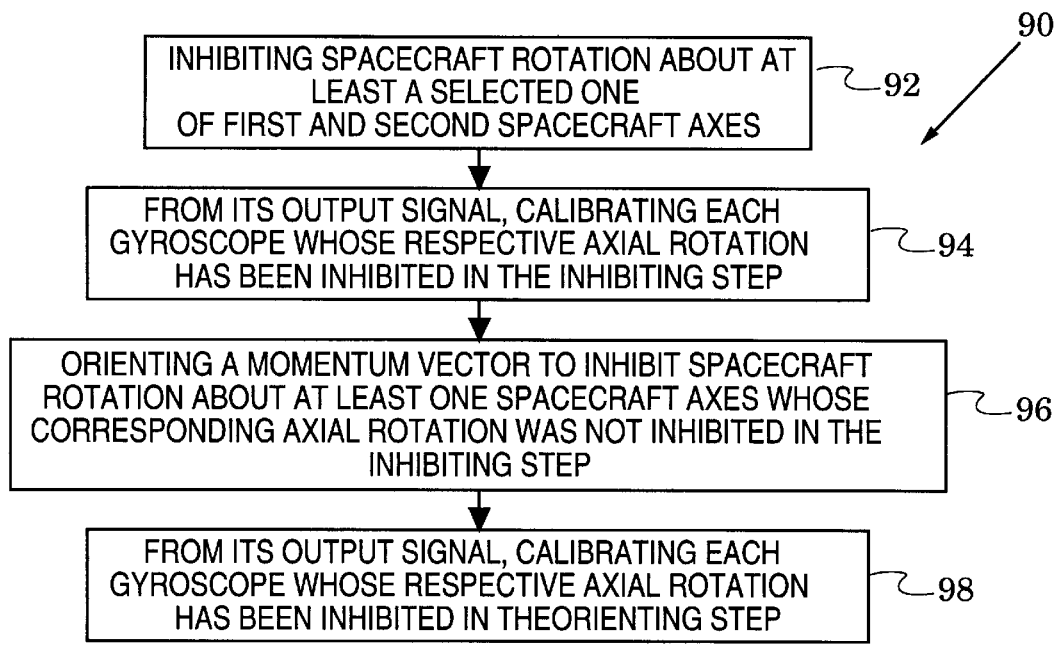
FIG. 4 is a flow chart which illustrates steps of another gyroscopic calibration process.
Figure 5:
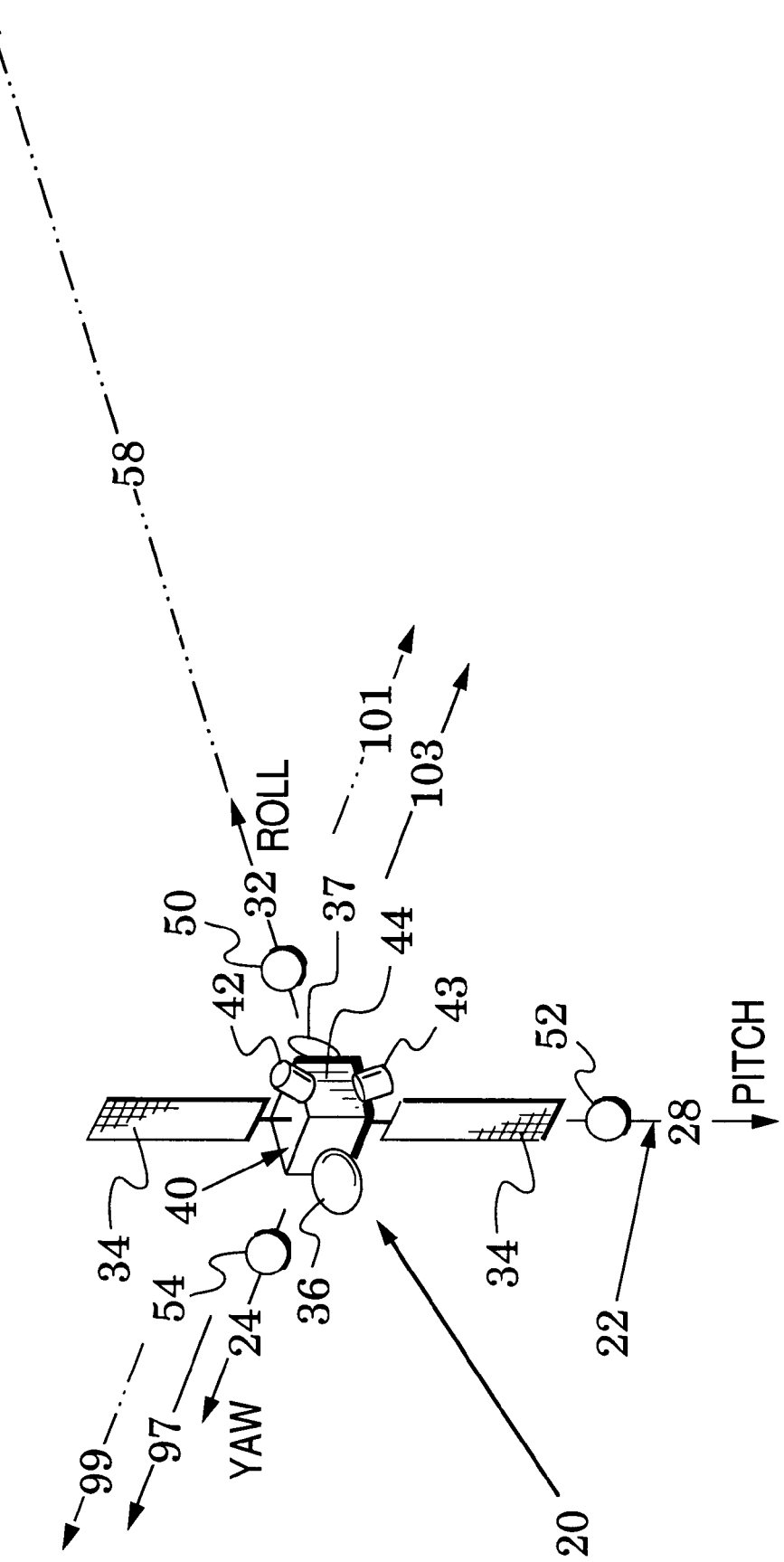
FIG. 5 is a view similar to FIG. 3A which illustrates process steps of the flow chart of FIG. 4.

Another method embodiment of the invention for calibrating gyroscopes is illustrated in the flow chart 90 of FIG. 4 and exemplified in FIG. 5 which is similar to FIGS. 3A–3C with like elements indicated by like reference numbers.

The first process steps 92 and 94 of the flow chart are similar to the first steps 62 and 64 of the flow chart 60 of FIG. 1. As mentioned above, the first step 92 can be realized with the spacecraft's attitude control system and feedback signals from any radiating-body sensor. In a particularly effective embodiment, this step can be realized with feedback signals from either a single-axis Sun sensor that inhibits rotation about one axis (e.g., the yaw axis 24) or a two-axis Sun sensor that inhibits rotation about two axes (e.g., the yaw and pitch axes 28 and 32).

Let it initially be assumed that a single-axis Sun sensor was employed in process step 92 to inhibit rotation about the yaw axis but permit rotation about the roll and pitch axes. In process step 94, therefore, the yaw gyroscope will be calibrated from its output signal. Because rotation about the yaw axis is being inhibited, the output signal represents the drift signal of this gyroscope.

In process step 96, a momentum vector is oriented to inhibit inertial rotation about spacecraft axes whose corresponding rotation was not inhibited in step 62. This step is realized with a spacecraft's attitude-control system which may include any conventional momentum devices, e.g., momentum wheels, reaction wheels or gimballed wheel system.

Because of the properties of momentum, a momentum vector resists disturbance of its inertial attitude. Accordingly, a momentum vector is most effective at inhibiting rotation in a selected space(raft axis if it is orthogonally arranged with that selected axis. In particular, rotations are inhibited in an inertial plane that is orthogonal to the momentum vector. However, rotation will still be inhibited as long as a vector component is orthogonal to the selected axis. The momentum vector loses its effectiveness only when it is oriented parallel to the selected spacecraft axis.

Initially assume in step 96 that a momentum vector is directed parallel to the yaw axis as indicated by the momentum vector 97 in FIG. 5. The momentum vector is now orthogonal to the roll-pitch plane and rotation is therefore inhibited about both of the roll and pitch axes. In step 98, therefore, calibration of the roll and pitch gyroscopes is effected with their output signals. These signals represent each gyroscope's drift signal because of the rotational inhibition about their axes.

An existing momentum vector in the spacecraft 20 of FIG. 5 will probably not be initially directed in accordance with process step 96 of FIG. 4 and thus it must be altered or generated. A momentum vector's direction cannot be altered without disturbing the spacecraft's attitude unless offsetting external torques are exerted upon the spacecraft during the alteration. Accordingly, the methods of the invention may include a step of imposing an external torque to maintain the spacecraft's inertial attitude during step 96. These torques can be imposed with any conventional external torque source, e.g., thrusters.

In an exemplary process, external torque sources can generate a torque vector 99 that is shown with a broken line in FIG. 5. This vector is directed parallel to the desired momentum vector 97. The spacecraft's attitude-control system is employed to prevent disturbance of the spacecraft's attitude by generating an opposing torque vector 101. For example, momentum wheel speeds are altered to produce the torque vector 101 in the spacecraft body 40.

The external torque is applied for a time sufficient to build up the desired momentum in the wheels of the attitude-control system. After the external torque 99 and the opposing torque 101 are removed, altered wheel speeds now generate the desired momentum vector 97. When desired, the momentum vector of process step 96 can be reoriented by repeating this application of external torques.

Although the momentum vector 97 was generated to be orthogonal to the roll-pitch plane, the methods of the invention can be practiced with other momentum vectors that have at least a vector component that is orthogonal to this plane. If a two-axis Sun sensor is used to realize process step 92, then the yaw and pitch gyroscopes are calibrated in step 94 and the momentum vector (97 in FIG. 5) need only have a component that is orthogonal to the roll axis 32.

Constantly applied torque from external sources (e.g., solar pressure, outgassing and gravity gradients) will urge the momentum vector 97 of FIG. 5 to precess. In these situations, the gyroscope's output signals will not simply equal their drift signal but will also include a precession error signal.

A method of reducing the precession error is to reverse the momentum vector 97, i.e., redirect it to the reversed momentum vector 103 of FIG. 5. As remarked above, external torques will be required to redirect the momentum vector while maintaining the spacecraft's attitude. Process step 98 is now repeated and the calibration results that were obtained with the original momentum vector and the reversed momentum vector are averaged. This method modification effectively reduces the precession error because the precession effect is reversed in the second measurement.

Alternatively, the magnitude H of the momentum vector 97 may be altered to a different magnitude, e.g, H/2. Because colinear momentum vectors having momentum magnitudes of H and H/2 will generate a first precession effect that is ½ that of a second precession effect, the precession torque can be resolved with the data from two different momentum vectors.

Figure 6:
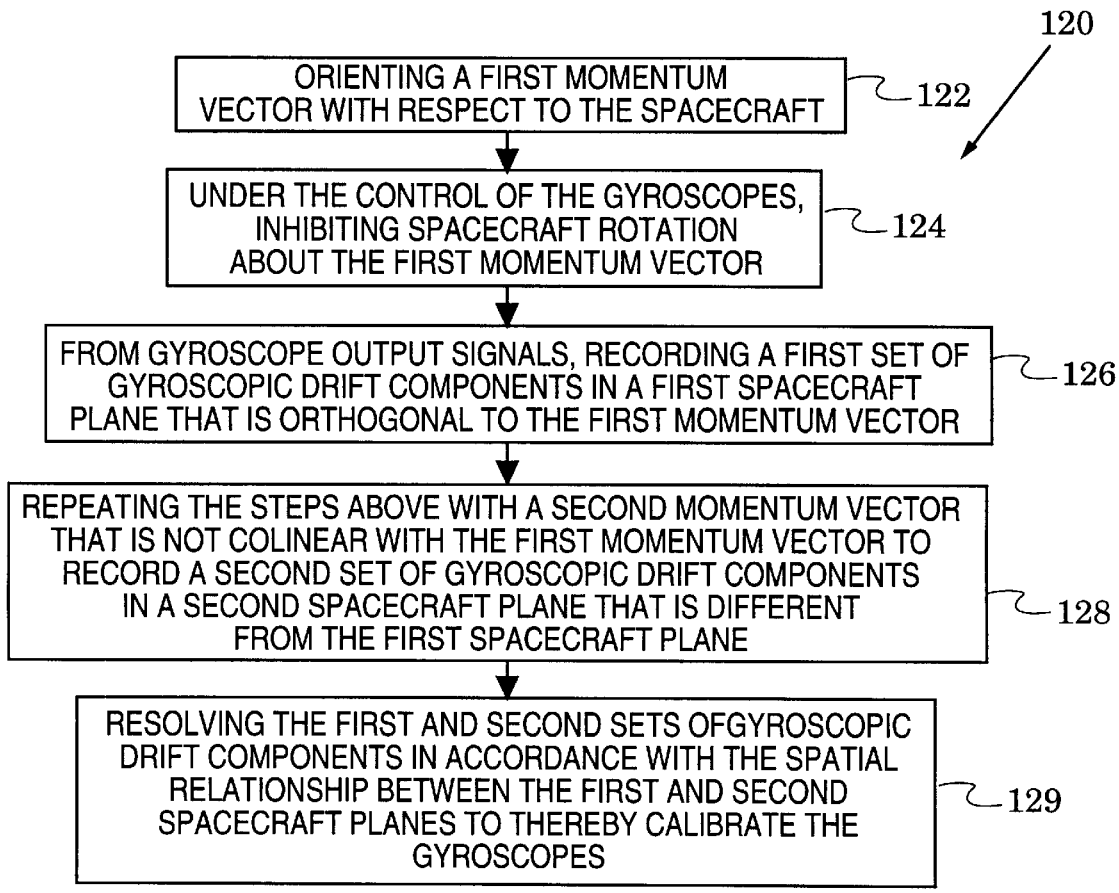
FIG. 6 is a flow chart which illustrates steps of another gyroscopic calibration process.
Figure 7:
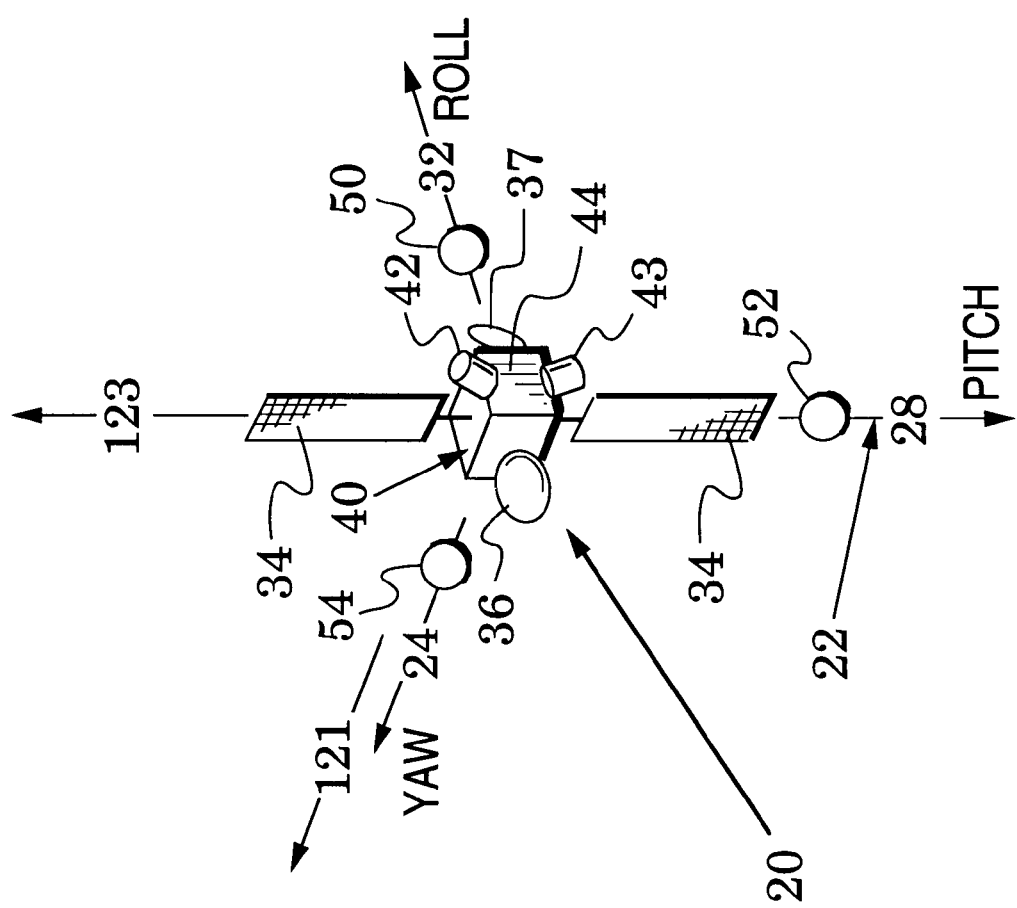
FIG. 7 is a view similar to FIG. 5 which illustrates process steps of the flow chart of FIG. 6.

Another method embodiment of the invention for calibrating gyroscopes is illustrated in the flow chart 120 of FIG. 6 and exemplified in FIG. 7 which is similar to FIG. 5 with like elements indicated by like reference numbers. In a significant feature of this embodiment, the process steps of FIG. 6 do not require the availability of a radiating-body sensor (e.g., a Sun sensor).

In this method a momentum vector 121 is initially oriented in a first inertial direction as shown in FIG. 7. Although an existing momentum vector can be used, it will generally be necessary to generate this momentum vector with the aid of external torque generators and the spacecraft's attitude-control system as previously described.

Once the first momentum vector has been established, attitude of the spacecraft is controlled in the direction of the first momentum vector (i.e., spacecraft rotation about the momentum vector 121 is inhibited) and a first set of gyroscopic output signals are recorded. These signals represent gyroscopic drift components in a first spacecraft plane that is orthogonal to the first momentum vector.

This procedure is repeated with a second momentum vector, e.g., the momentum vector 123 of FIG. 7, that is not colinear with the first momentum vector. This procedure repetition generates a second set of gyroscopic output signals which represent gyroscopic drift components in a second spacecraft plane that is orthogonal to the second momentum vector and that is, therefore, orthogonal to the first spacecraft plane. Because the first and second signal sets indicate gyroscopic drift components in two different spacecraft planes, these components can be mathematically resolved to form the gyroscopic drifts of the three gyroscopes 50, 52 and 54.

These procedures are summarized in the flow chart 120 of FIG. 6. In a first process step 122, a first momentum vector is oriented in the spacecraft. In a second process step 124, inertial rotation of the spacecraft is inhibited under gyroscopic control about the first momentum vector. Gyroscopic output signals are then sensed in step 126 to determine a first set of gyroscopic drift components in a first spacecraft plane that is orthogonal to the first momentum vector.

In step 128, steps 122, 124 and 126 are repeated for a second momentum vector that is not colinear with the first momentum vector. Thus, a second set of gyroscopic drift components are obtained in a second spacecraft plane that differs from the first spacecraft plane. In a last process step 129, the first and second sets of drift components are mathematically resolved in accordance with the spatial relationship between the first and second spacecraft planes to determine gyroscopic drifts, i.e., to calibrate the gyroscopes.

External torques may cause precession of the first and second momentum vectors and thus induce precession errors in the drift measurement. Such errors can be reduced by obtaining additional sets cf drift components, i.e., repeating steps 122, 124 and 126 of FIG. 6 for at least one additional momentum vector.

It was indicated above that the spacecraft's inertial attitude was preferably stabilized about the momentum vectors under gyroscopic control. This reduces momentum contributions of the spacecraft's structure. Accordingly, it can be assumed that momentum is substantially limited to the wheel system where it can be accurately measured. The concepts of the invention can be practiced without process step 124 of FIG. 6 but it complicates realization of the methods because it requires accounting for momentum of the spacecraft's structure.

In a variation of this calibration method, the spacecraft's inertial attitude can be maintained (e.g., with external thrusters) during process step 122. That is, the external torque generators can be used to maintain a constant spacecraft inertial attitude in the presence of both the first and second momentum vectors. However, this is not required and may be neglected to conserve thruster fuel.

The first and second momentum vectors 121 and 123 are shown to be orthogonal in FIG. 7 and aligned with spacecraft axes (e.g., the yaw and pitch axes 24 and 28. Although such a momentum vector arrangement may simplify computations that resolve the gyroscopic drifts, may enhance independence of data sets and may facilitate inhibition of spacecraft rotation, the method teachings that are exemplified in FIGS. 6 and 7 can be carried out with any two momentum vectors that are not colinear.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of calibrating gyroscopic drifts of gyroscopes which each generate an output signal that represents rotation about a respective axis of a spacecraft, said method comprising the steps of:

inhibiting spacecraft rotation about at least one of first and second spacecraft axes;

from its output signal, calibrating each gyroscope whose respective axial rotation has been inhibited in said inhibiting step;

for any uncalibrated gyroscope, slewing said spacecraft under control of another gyroscope so that it rotates by a slew angle in a plane defined by the uncalibrated gyroscope's respective axis and the respective axis of a calibrated gyroscope;

for a selected time period, controlling the spacecraft's attitude with said uncalibrated gyroscope to thereby generate an attitude error angle;

backslewing said spacecraft under control of said another gyroscope by a backslew angle that is substantially equal and opposite to said slew angle;

measuring said error angle; and calibrating said uncalibrated gyroscope from said slew angle, said selected time period and said error angle.

2. The method of claim 1, wherein said inhibiting and measuring steps are each implemented with a step of detecting spacecraft attitude with a Sun sensor.

3. The method of claim 1, wherein said measuring step includes the steps of:

eliminating said error angle with a rotation, under the control of said calibrated gyroscope, of said spacecraft by a calibrated correction angle that is substantially equal and opposite to said error angle; and substituting said correction angle for said error angle in said calibrating step.

4. The method of claim 1, wherein said inhibiting step includes the step of employing a single-axis Sun sensor to inhibit rotation about a selected one of said first and second axes.

5. The method of claim 1, wherein said slew angle is substantially ninety degrees.

6. The method of claim 1, wherein said slew angle differs from ninety degrees by a difference angle and the calibrating step of said uncalibrated gyroscope includes a step of calculating {correction angle×cos (difference angle)}/time period.

7. The method of claim 1, further including a step of repeating said slewing, controlling, backslewing and rotating steps with a reversed slew angle and wherein the calibrating step of said uncalibrated gyroscope includes the step of averaging the results obtained with said slew angle and said reversed slew angle.

8. A method of calibrating gyroscopic drifts of gyroscopes which each generate an output signal that represents rotation about a respective axis of a spacecraft, said method comprising the steps of:

inhibiting spacecraft rotation about at least a selected one of first and second spacecraft axes;

from its output signal, calibrating each gyroscope whose respective axial rotation has been inhibited in said inhibiting step;

orienting a momentum vector to inhibit inertial rotation about at least one spacecraft axis whose corresponding axial rotation was not inhibited in said inhibiting step; and from its output signal, calibrating each gyroscope whose respective axial rotation has been inhibited in said orienting step.

9. The method of claim 8, wherein said inhibiting step includes the step of controlling attitude of said spacecraft with feedback signals from a Sun sensor.

10. The method of claim 8, wherein said inhibiting step includes the step of limiting said inhibiting step to one of said first and second axes and further including the step of employing a single-axis Sun sensor to realize said inhibiting step.

11. The method of claim 8, wherein said inhibiting step includes the step of extending said inhibiting step to both of said first and second axes and further including the step of employing a two-axis Sun sensor to realize said inhibiting step.

12. The method of claim 8, wherein said orienting step includes the step of generating said momentum vector with a momentum device selected from a group that includes reaction wheels, momentum wheels and a gimballed wheel system.

13. The method of claim 8, wherein said orienting step includes the step of directing said momentum vector substantially parallel to said selected spacecraft axis.

14. The method of claim 8, wherein said orienting step includes the steps of:

generating said momentum vector with a momentum device selected from a group that includes reaction wheels, momentum wheels and a gimballed wheel system; and maintaining spacecraft attitude during said generating step with an applied external torque.

15. The method of claim 8, further including the steps of:

repeating said orienting step and its respective calibrating step with a different momentum vector; and modifying the initial gyroscope calibration with output signals obtained with said different momentum vector.

16. A method of calibrating gyroscopic drifts of gyroscopes which each generate an output signal that represents rotation about a respective axis of a spacecraft, said method comprising the steps of:

successively orienting in said spacecraft first and second momentum vectors that are not colinear;

noting output signals of said gyroscopes during successive presences of said first and second momentum vectors, said output signals representing first and second sets of gyroscopic drift components in first and second spacecraft planes that are respectively orthogonal to said first and second momentum vectors; and resolving said first and second sets of gyroscopic drift components in accordance with the spatial relationship between said first and second spacecraft planes to thereby find said gyroscopic drifts.

17. The method of claim 16, further including the step of successively inhibiting rotation of said spacecraft about said first and second momentum vectors to reduce spacecraft contributions to said momentum vectors.

18. The method of claim 16, wherein said orienting step includes the step of causing said second momentum vector to be substantially orthogonal to said first momentum vector.

19. The method of claim 16, wherein said orienting, step includes the step of generating said momentum vector with a momentum device selected from a group that includes reaction wheels, momentum wheels and gimballed wheel systems.

20. The method of claim 16, wherein said orienting step includes the steps of:

generating said momentum vector with a momentum device selected from a group that includes reaction wheels, momentum wheels and a gimballed wheel system; and maintaining spacecraft attitude during said generating step with an applied external torque.

* * * * *